July 26, 1966     L. H. TEEL ETAL     3,262,403
FORMING DEVICE

Filed July 29, 1963                    2 Sheets-Sheet 1

INVENTORS
JOSEPH C. DENNESEN,
BY LAWRENCE H. TEEL
Ezekiel Wolf, Wolf & Greenfield
ATTORNEYS July 26, 1966  L. H. TEEL ETAL  3,262,403
FORMING DEVICE Filed July 29, 1963  2 Sheets-Sheet 2

INVENTORS
Joseph C. Dennesen,
BY Lawrence H. Teel
Ezekiel Wolf, Wolf + Greenfield
ATTORNEYS

United States Patent Office 3,262,403
Patented July 26, 1966

3,262,403
FORMING DEVICE
Lawrence H. Teel, Marblehead, and Joseph C. Dennesen, Beverly, Mass. (both of 35 Congress St., Salem, Mass.)
Filed July 29, 1963, Ser. No. 298,159
11 Claims. (Cl. 107—47)

This invention relates to forming devices and more particularly comprises a novelty device for forming lollipops from other confections made of yieldable substances.

This invention is provided primarily for the enjoyment of children and allows them to effectively recast a candy having a formable consistency into a lollipop. Made as a toy it can typically transform a Tootsie Roll or a caramel candy into a lollipop. The device peculiarly lends itself to the promotional advertising of the candy which it may transform, particularly if the device is manufactured inexpensively and is capable of performing its function without any danger to the user or contamination of the candy.

One important object of this invention is to provide a novelty device which may be used effectively in the promotion and sale of confectionery.

Another important object of this invention is to provide an extremely inexpensive molding device for transforming the shape of candy and when desired for recasting the candy about a stick to convert the confection to a lollipop.

Still another important object of this invention is to provide a candy molding device which may be operated by a very young child with complete safety.

Still another important object of this invention is to provide a candy molding machine operable by a youngster and which is capable of being made in the form of such youth appealing machines as projectiles, guns, etc.

To accomplish these and other objects the device includes a body member and a ram member movable axially in the body member. Means are attached to one end of the body member and define with the adjacent or facing end of the ram member a cavity for forming the candy into the desired shape. A recess is provided in one of the two members, which communicates with the cavity and which receives the lollipop stick and retains it in the device with one end of the stick extending into the cavity. As a result, when the ram applies pressure to candy deposited in the cavity, the candy is reshaped about the end of the stick.

These and other objects and features of this invention along with its incident advantages will be better understood and appreciated from the following detailed description of several embodiments thereof, selected for purposes of illustration and shown in the accompanying drawing, in which.

Figure 1:
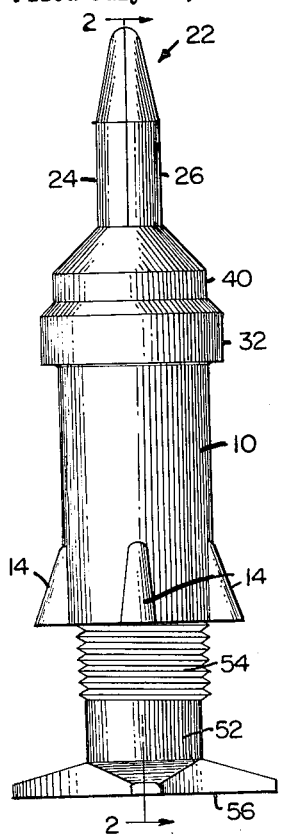
FIG. 1 is an elevation view of one embodiment of forming device constructed in accordance with this invention.

The embodiment of this invention shown in FIGS. 1–4 is shaped as a rocket. The actual device may be approximately 6″ in length and preferably is made of an extremely inexpensive material suitable for the use, such as polystyrene. Made of such material the device including each of its components may conveniently be molded to shape for mass production. The device includes a generally cylindrical body 10 having a lower internally threaded section 12. The body is shown to include four simulated stabilizing fins 14 about its lower end 16, and the body is formed with an enlarged collar 18 at its upper end, and an annular seat 20 is provided in the collar.

A head member 22 which serves as a cap to close the upper end of the body is made of a pair of identical parts 24 and 26. The member 22 has an upwardly extending stem 28 and a lower closure end or cap 30 which sits on the collar 18 of the body with its downwardly extending skirt 32 provided with an inwardly extending annular tongue 34 disposed in the seat 20. The member 22 is readily assembled on the body 10 because it is made in two parts, and each part may be slipped over one half of the end 18 of the body with its tongue 34 disposed in the seat. A clamping ring 36 slips over the head member 22 and is provided with an opening 38 at its center through which the stem 28 extends. The clamping ring 36 made of one piece retains the two parts 24 and 26 of the member 22 in the assembled relationship shown in the drawing. The ring 36 includes a cylindrical wall 40 which fits tightly about the mating portion of the member 22 immediately above the skirt 32 to maintain the parts in an assembled relationship.

Figure 2:
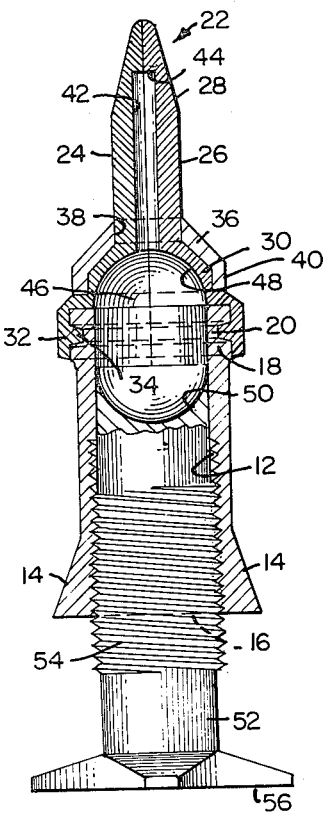
FIG. 2 is a cross-sectional view taken along the section line 2—2 in FIG. 1.

The stem 28 defined by each of the parts 24 and 26 has an elongated recess 42 of a diameter sufficient to receive the stick of the lollipop to be formed by the device. The recess 42 is somewhat shorter than the stick so that when the upper end of the stick bears against the closed end 44 of the recess the other end of the stick extends into the forming cavity 46 defined beneath the cap end 30 of the head member. In FIG. 2 the cavity 46 is shown to be defined in part by a semispherical surface 48 forming the inner wall of the cap end 30 of the member 22, and the cavity 46 is also defined in part by the spherical surface 50 on the upper end of ram member 52.

The ram member 52 is generally cylindrical in shape and is provided with a threaded portion 54 which screws into the threaded portion 12 of the body. The lower end of the ram 52 is provided with a base 56 which simulates the similarly located fins of a rocket having the general appearance of the embodiment of fins 1–4.

It is evident upon an inspection of FIG. 2 that the ram 52 may be screwed into and out of the body 10 and its rotation causes the surface 50 to move axially toward and away from the semispherical surface 48 of the cap end of the member 22. When the ram 52 is threaded fully into the body 10 the semispherical surfaces 48 and 50 together define the spherical cavity 46.

Figure 3:
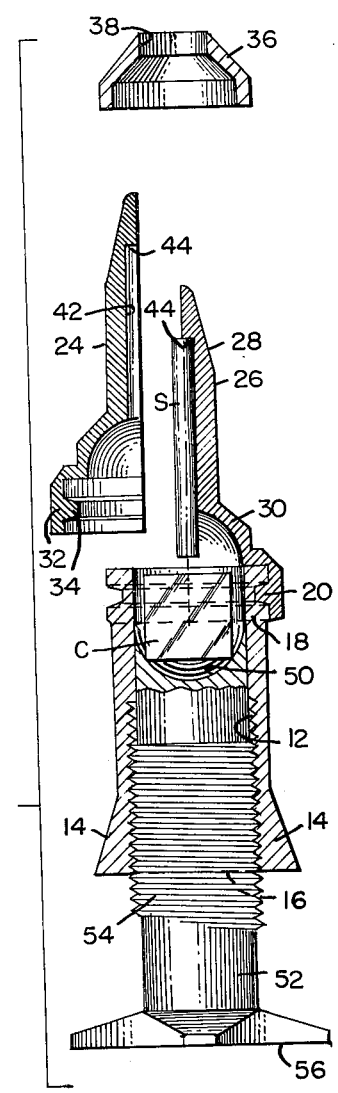
FIGS. 3 and 4 are cross-sectional views suggesting the manner in which the device of FIGS. 1 and 2 is used to reshape candy into a lollipop.
Figure 4:
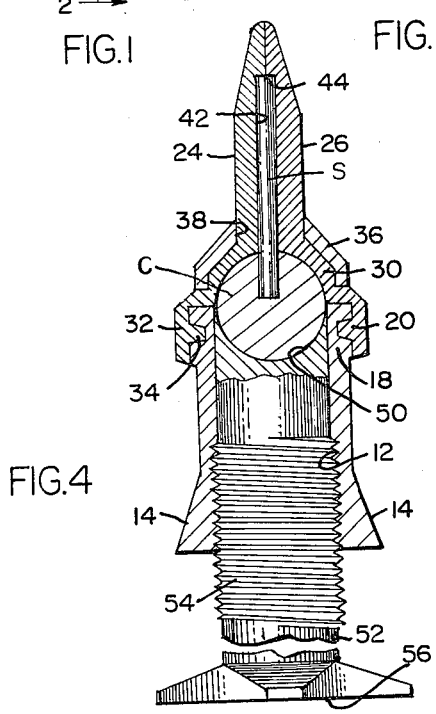

In FIGS. 3 and 4 the operation of the device is suggested. A youngster wishing to make a lollipop removes the clamping ring 36 and disassembles the two parts 24 and 26 of the head member 22. He then places a piece of candy C, such as a caramel or a Tootsie Roll, into the body 10 above the surface 50 of the ram 52. Next the youngster mounts one part 24 or 26 of the member 22 in place on the upper end 18 of the body, deposits a stick S in the portion of the recess 42 provided in that part and then assembles the other part of the member 22 and finally slips the clamping ring 36 over the stem 28 to maintain the several components in their assembled relationship. When this is done one end of the stick S extends into the cavity 46. The youngster may then hold the body in any desired orientation and he turns the ram 52 causing it to move inwardly of the body. The fins 14 and 56 on the body and ram provide a convenient handle to rotate the members relative to one another. Ultimately the semispherical surface 50 cooperates with the surface 48 to reshape the candy C deposited in the cavity so that the candy conforms to the shape of the cavity itself. Because the stick in the recess 42 extends into the cavity 46 (and is not so long as to interfere with movement of the ram), the candy molded in the cavity 46 will form about the end of the stick and adhere to it. When the lollipop is fully formed in a manner described, the youngster then removes the clamping ring 36 from the member 22, separates the parts 24 and 26, and then grasps the stick of the lollipop and removes it with the candy from the cavity 46.

Figure 5:
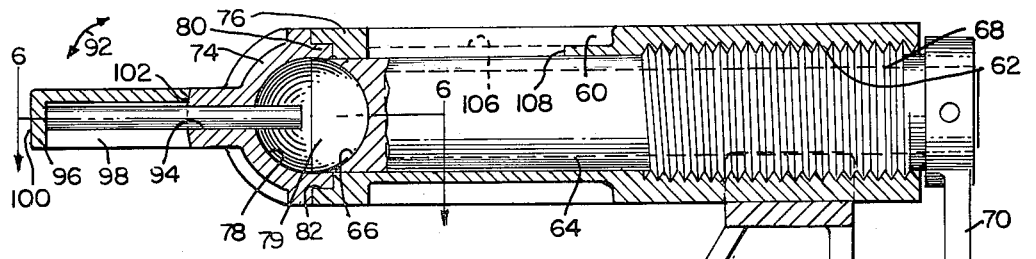
FIG. 5 is a cross-sectional view of another embodiment of this invention.

The embodiment shown in FIG. 5 is similar to that of FIG. 1 and its parts cooperate generally in the same manner to form the lollipop. This embodiment includes a body 60 having an internally threaded portion 62 and a ram 64. The ram 64 is shown in the drawing to be generally hollow and is provided with a forming surface 66 which is semispherical in shape. The outer end 68 of the ram 64 carries a crank 70 having a handle 72 to assist in turning the ram to move it axially in the body 60.

A cap 74 closes the other end 76 of the body 60 and like the cap portion of the previous embodiment is provided with a semispherical surface 78 which cooperates with the like surface 66 to define a spherical cavity 79 whose shape is to be imparted to the candy deposited in the device. The cap 74 in this embodiment is shown made of one piece and is provided with a flange 80 which cooperates with a seat 82 provided in the end 76 of the body to removably retain the cap in place.

Figure 6:
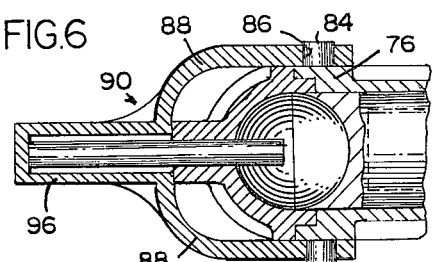
FIG. 6 is a fragmentary cross-sectional view taken along the section line 6—6 in FIG. 5.

In FIG. 6 the end 76 of the body is shown to have a pair of outwardly extending pins 84 which fit within openings 86 provided in the ends of the arms 88 of yoke 90 which serves as a keeper to retain the cap 74 in place. The yoke 90 pivots on the pins 84 as suggested by the arrow 92 in FIG. 5.

The cap 74 is shown in FIG. 5 to have an elongated recess 94 in its center, which is oriented radially with respect to the cavity 79. The recess 94 receives the stick of a lollipop to be formed by the device, and a retaining member 96 carried on the yoke 90 holds the stick in place in the recess 94 when the ram is tightened on the candy in the cavity to form it into the shape desired. In FIG. 5 the retaining member 96 is shown to include a trough 98 closed at its outer end by the wall 100 against which the lollipop stick bears to prevent its other end from being pushed from the cavity as the ram is tightened on the candy.

The yoke 90 and its retaining member 96 serve two functions; first, as described above, it serves to retain the stick in place when the candy is being formed by screwing the ram into the body, and secondly, the yoke 90 engages the end 102 of the cap 74 to retain its flange in the seat 82. Thus, when the yoke and retainer are in the position shown in FIG. 5, the cap 74 is firmly retained on the body 60 and the wall 100 is positioned to retain the lollipop stick with its end within the cavity mold. When the yoke and retainer are moved to their alternative position, the recess 94 is exposed so that a stick may be slipped into it and the cap 74 may be removed from the body so that the lollipop can be removed when formed.

The device shown in FIGS. 5 and 6 simulates a machine gun and for that purpose a stand 104 is provided which holds the body 60 in a horizontal position, and the stand is tall enough so that the crank 70 can be turned without interference from the supporting surface. The gun is further simulated by the provision of an opening 106 in the body 60 through which the candy may be dropped into the cavity 79 in front of the semispherical surface 66 of the ram when the ram is partially withdrawn. It will be evident from this description that when a youngster desires to make a lollipop he partially unscrews the ram to withdraw the surface 66 behind the end 108 of the slot 106 so that the candy may be dropped into the body cavity. The youngster also lifts the yoke and retainer by pivoting it clockwise as shown in FIG. 5 so that the lollipop stick may be inserted through the recess 94. Next he lowers the yoke and retainer to the position shown in the drawing and screws the ram into the body to form the candy into a lollipop ball about the end of the stick within the cavity. The youngster then removes the lollipop by lifting the yoke and retainer again, removing the cap 74, and slipping the lollipop stick out of the recess 94 in the direction of the ball of candy formed about it.

Figure 7:
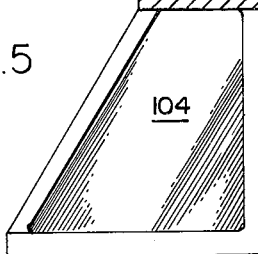
FIG. 7 is an elevation view of yet another embodiment of this invention.
Figure 7:
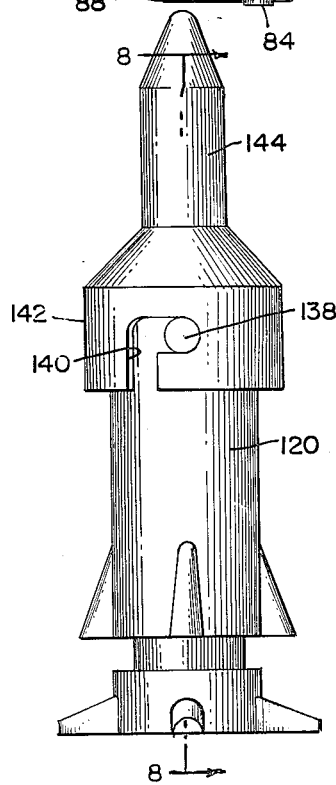
Figure 8:
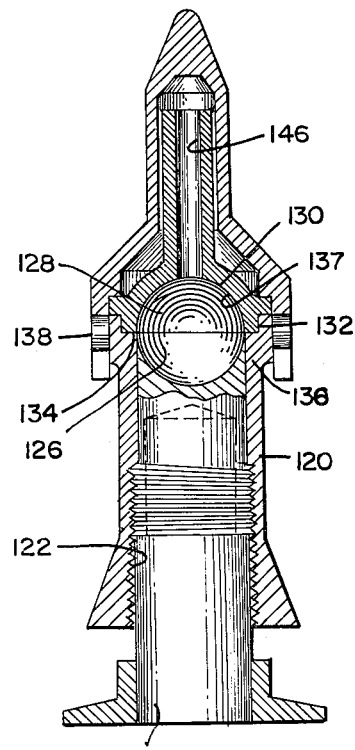
FIG. 8 is a cross-sectional view taken along the section line 8—8 in FIG. 7.

The embodiment of FIGS. 7 and 8 generally resembles the embodiment of FIGS. 1–4. Thus, the device includes a body 120 having an internally threaded portion 122 into which the ram 124 is screwed. The upper end of the ram as viewed in FIG. 8 has a semispherical surface 126 which in part defines the cavity 128 for molding the candy into the desired shape. A cap 130 similar to the cap 74 of the previous embodiment has a flange 132 which fits within a seat 134 in the collar 136 of the body and is also provided with a semispherical surface 137 which cooperates with the surface 126 to define the cavity 128.

A pair of pins 138 extend outwardly from opposite sides of the collar 136 of the body, and they cooperate with slots 140 in the skirt 142 of hood 144 to form a bayonet type connection between the hood and the body. It is obvious from an inspection of FIG. 7 that the hood is removed by turning it a few degrees on the body until the pins 138 are aligned with the axially extending portions of the slot 140. The hood 144 like the yoke and retainer of the previous embodiment serves to hold the cap 130 in place on the body and to retain the lollipop stick with its end in the cavity 128. The hood 144 is removed to insert the stick in recess 146 provided in the cap 130 and is also removed when the lollipop is formed so that the cap may itself be disassembled from the body to allow the lollipop in turn to be removed.

Like the embodiment of FIGS. 1–4 the body 120 and ram 124 are provided with simulated stabilizing fins. These fins not only tend to simulate the appearance of a rocket, but in addition perform the functional task of providing a convenient grip for the body and ram so that they may be turned relative to one another when the device is used to form the lollipop.

From the foregoing description those skilled in the art will appreciate that each of the embodiments of this invention shown can be manufactured inexpensively from a material which is wholly compatible with the food products with which the device is used, and the device may be operated by a youngster without difficulty and without any likelihood of injury. It is also obvious that the cavity shapes can be other than spherical to form the lollipops into other configurations, and the device as a whole can be made in other shapes such as cartoon characters, airplanes, etc. Because the device lends itself to modification within the scope of the invention, it is not intended that the breadth of this invention be limited to the specific embodiments illustrated and described. Rather, it is intended that the scope of this invention be determined by the appended claims and their equivalents.

What is claimed is:
1. A lollipop making device comprising
a cylindrical body open at both ends and internally threaded over a portion of its length,
a head member made in separable parts removably secured to one end of the body and partially defining at that end a molding cavity open in the direction of the body,
an elongated recess defined by the separable parts of the member and communicating with the cavity, said recess housing the lollipop stick,
and a ram screwed into the threaded portion of the body from its other end and partially defining the molding cavity defined in part by the member.

2. A lollipop making device comprising
a cylindrical body internally threaded over a portion of its length,
means defining in part at one end of the body a cavity open in the direction of the body,
means defining an elongated recess in communication with the cavity for housing the stick of the lollipop, said recess being coaxial with the body,
and a ram screwed into the body from its other end and defining with the first mentioned means the cavity to form the lollipop when the ram is screwed fully into the body.

3. A lollipop making device as defined in claim 2 further characterized by
said body and ram together being rocket shaped.

4. A lollipop making device as defined in claim 2 further characterized by
said cavity being spherical in shape when the ram is screwed fully into the body.

5. A lollipop making device comprising
a cylindrical body internally threaded over a portion of its length,
means detachably mounted on the body for closing one end of the body and defining in part a mold cavity in the body,
a recess provided in the closing means for receiving a lollipop stick with its end positioned in the cavity and with the stick coaxial with the body,
and a ram threaded into the body and movable axially when turned in the threads and defining the remaining portion of the cavity.

6. A lollipop making device comprising
a body member and a ram member movable axially in the body member,
means closing one end of the body member and defining with the ram member a closed cavity for forming a lollipop into a desired shape,
and means defining an elongated recess in one of the two members parallel to the axis of the two members and sized to receive the handle of a lollipop stick, said recess being closed at one end and open at the other end to the cavity and retaining the handle of the lollipop stick when the ram member is moved axially in the body.

7. A lollipop making device as defined in claim 2 further characterized by
said first mentioned means comprising a cap over one end of the body,
said means defining an elongated recess being an opening extending through the cap,
and retaining means movably secured to the body for retaining the stick in the opening with its end in the cavity when the ram is moved toward the cap.

8. A lollipop making device as defined in claim 7 further characterized by
said cap being removably secured to the body for closing said one end,
and said retaining means engaging the cap when it engages the stick for retaining the cap on the body.

9. A lollipop making device as defined in claim 8 further characterized by
said retaining means being pivotally secured to the body and movable between a first position wherein it holds the cap on the body and the stick in the recess and a second position wherein the cap may be removed from the body and the stick may be placed in or removed from the opening.

10. A lollipop making device as defined in claim 7 further characterized by
said retaining means having a bayonet-type coupling with the body and being removable from said body.

11. A candy shaping device comprising
a cylindrical body threaded over a portion of its length,
a ram screwed into the body and movable axially in the body in response to relative rotation of the body and ram,
and a cap removably secured over the end of the body opposite the ram and having an elongated recess therein parallel to the axis of the body and sized to receive the handle end of a lollipop stick disposed parallel to the body axis, said cap closing its end of the body and defining with the ram a cavity for shaping the candy, said recess being open at one end to the cavity for holding the other end of the stick in the cavity when the candy is shaped.

References Cited by the Examiner
UNITED STATES PATENTS

| | | | |
|---|---|---|---|
| 693,631 | 2/1902 | Tilden et al. | 107—16 |
| 1,392,863 | 10/1921 | Webke | 107—15 |

WALTER A. SCHEEL, *Primary Examiner.*

ROBERT E. PULFREY, *Examiner.*

JOSEPH SHEA, *Assistant Examiner.*